No. 789,913. PATENTED MAY 16, 1905.
I. HOTALING.
WHEEL FOR TRACTION ENGINES.
APPLICATION FILED JAN. 27, 1905.

WITNESSES:
H. F. Hoyle.
E. C. Hough.

INVENTOR
Irvin Hotaling,
By Franklin H. Hough.
Attorney

No. 789,913.                                   Patented May 16, 1905.

UNITED STATES PATENT OFFICE.

IRVIN HOTALING, OF CRAB ORCHARD, NEBRASKA.

WHEEL FOR TRACTION-ENGINES.

SPECIFICATION forming part of Letters Patent No. 789,913, dated May 16, 1905.

Application filed January 27, 1905. Serial No. 242,911.

*To all whom it may concern:*

Be it known that I, IRVIN HOTALING, a citizen of the United States, residing at Crab Orchard, in the county of Johnson and State of Nebraska, have invented certain new and useful Improvements in Wheels for Traction-Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments for wheels of heavy vehicles, and especially adapted for traction-engines; and it consists in the provision of means whereby wheels may be prevented from slipping.

The invention consists in various details of construction and in combinations and arrangements of parts, which will be hereinafter fully described and then specifically defined in the appended claims.

My invention is illustrated in the accompanying drawings, in which—

Figure 1:
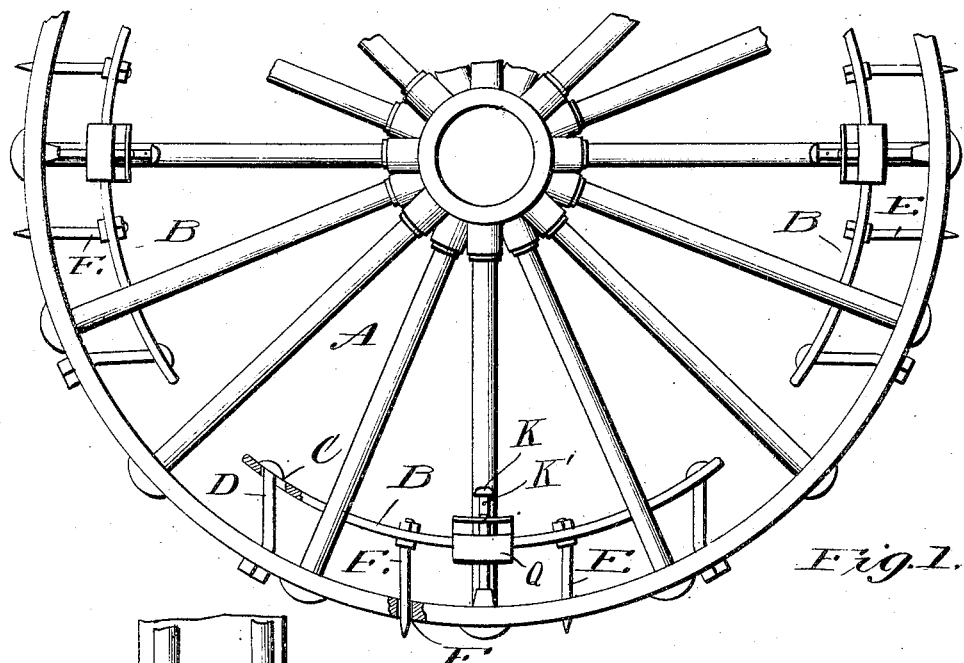
Figure 2:
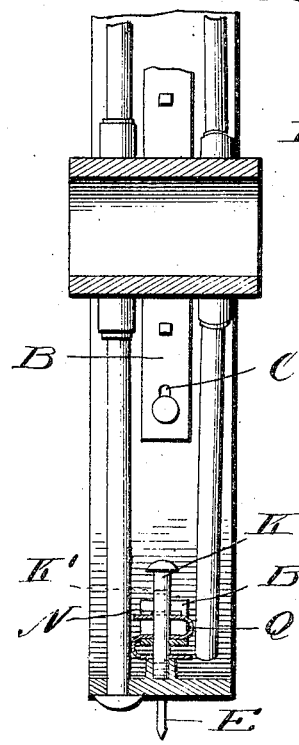
Figure 3:
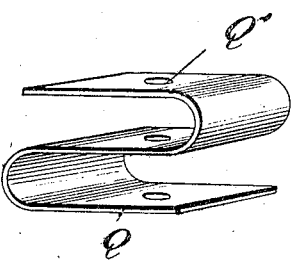

Figure 1 is a side elevation of a wheel, showing my device as applied thereto. Fig. 2 is a sectional view through the wheel at right angles to its axis, and Fig. 3 is a detail view of one of the S-shaped members provided to hold the spurs within the circumference of the wheel.

Reference now being had to the details of the drawings by letter, A designates a wheel, preferably of a traction-engine, and it is provided with a hub, radiating spokes, and a rim, usually of iron or other suitable metal.

B designates curved bars, which have apertures C therein, and D are bolts which pass through said bars and which are secured to the rim of the wheel in any suitable manner. Said bolts are provided as guides to hold said bars within the rim as they are moved toward or away from the same. Said bars have spurs E fixed thereto, which have a play through apertures F in the rim of the wheel. It is my purpose to have a plurality of these bars similarly arranged at different locations within the rim of the wheel, as shown. K designates a rod which is bolted or otherwise secured to the rim of the wheel and preferably midway of the length of said curved bar, through which it passes. Said rod K has apertures K' therein, adapted to receive a key N. Q designates an S-shaped member having registering apertures Q' therein, through which said rod K passes. One of the folds of the S-shaped member is adapted to engage the curved bar for the purpose of holding the same in an adjusted position. When the key N is placed in the bar near the inner end of said rod K, the spurs will be carried by the curved bar and will be held so that they will not project beyond the rim of the wheel, whereas when the key is inserted in the aperture near the other end of the rod K the spurs will be held so that they will project beyond the circumference of the wheel and afford means to bite into the ground to hold the wheel securely and prevent it from slipping.

While I have shown a particular form of apparatus illustrating my invention, it will be understood that I may vary the details of the same without in any way departing from the spirit of the invention.

Having thus fully described my invention, what I claim as new, and desire to secure by Letters Patent, is—

1. An attachment for wheels to prevent the same from slipping, comprising in combination with a wheel a movable bar mounted inside the rim thereof, guides carried by the rim of the wheel upon which said bar is mounted, spurs carried by the bar and passing through apertures in the rim of the wheel, as set forth.

2. An attachment for wheels to prevent the same from slipping, comprising in combination with a wheel a movable bar mounted inside the rim thereof, guides carried by the rim of the wheel upon which said bar is mounted, spurs carried by the bar and passing through apertures in the rim of the wheel, and means for holding said bar in an adjusted position, as set forth.

3. An attachment for wheels to prevent the same from slipping, comprising a movable bar, guides carried by the rim of the wheel upon which said bar is mounted, spurs carried by the bar and passing through apertures in the rim of the wheel, an S-shaped member, one of the folds of which is adapted to engage said bar, a rod secured to the rim and passing through said bar, said rod having apertures therein, and a key adapted to set said bar to hold the same in an adjusted position, as set forth.

4. An attachment for wheels to prevent the same from slipping, comprising in combination with a wheel, bolts secured to the rim and projecting inside the rim of the wheel, a curved bar having slots through which said bolts pass, spurs secured to said bar and passing through apertures in the rim of the wheel, a rod secured to the rim and passing through the middle portion of said bar, an S-shaped member, having registering apertures therein, mounted upon said rod, which passes through the middle of the bar, one of the folds of said S-shaped member being adapted to engage said bar, and a key designed to hold the bar in an adjusted position, as set forth.

In testimony whereof I hereunto affix my signature in presence of two witnesses.

IRVIN HOTALING.

Witnesses:
EMMA K. ROTHELL,
GEO. H. MYERS.